US007614357B2

(12) United States Patent
Hernandez et al.

(10) Patent No.: US 7,614,357 B2
(45) Date of Patent: Nov. 10, 2009

(54) STEP VOLTAGE REGULATOR POLYMER POSITION INDICATOR WITH NON-LINEAR DRIVE MECHANISM

(75) Inventors: Augusto D. Hernandez, Brookfield, WI (US); Augusto D. Hernandez, Jr., legal representative, New Berlin, WI (US); Jonathan M. Schaar, New Berlin, WI (US); Kurt L. Lindsey, West Allis, WI (US)

(73) Assignee: Cooper Technologies Company, Houston, TX (US)

( * ) Notice: Subject to any disclaimer, the term of this patent is extended or adjusted under 35 U.S.C. 154(b) by 89 days.

(21) Appl. No.: 10/656,881

(22) Filed: Sep. 8, 2003

(65) Prior Publication Data

US 2005/0061641 A1 Mar. 24, 2005

(51) Int. Cl.

| | |
|---|---|
| ***G01D 11/24*** | (2006.01) |
| ***G01D 5/04*** | (2006.01) |
| ***G01D 13/24*** | (2006.01) |
| ***G01D 13/26*** | (2006.01) |
| ***H01H 19/12*** | (2006.01) |

(52) U.S. Cl. ....................... 116/305; 116/289; 116/293; 116/296; 73/431

(58) Field of Classification Search ................. 116/284, 116/285, 289, 290, 293, 295, 297, 298, 300, 116/301, 302, 303, 305; 200/47, 11 TC, 200/6 R; 73/431, 866.3; 340/507, 531, 693.12, 340/693.5; 323/341; 220/664, 665; 312/100, 312/101, 102; 324/156

See application file for complete search history.

(56) References Cited

U.S. PATENT DOCUMENTS

| | | | | |
|---|---|---|---|---|
| RE22,233 | E | 12/1942 | Hill | |
| 2,800,248 | A * | 7/1957 | Bennekom et al. | 220/324 |
| 2,875,411 | A * | 2/1959 | Lamb | 324/151 R |
| 3,041,560 | A * | 6/1962 | Sealey | 336/45 |
| 3,092,071 | A | 6/1963 | Simpson, Jr. et al. | |
| 3,153,188 | A | 10/1964 | McCarty | |
| 3,427,530 | A | 2/1969 | Oakes et al. | |
| 3,619,764 | A | 11/1971 | Brennan | |
| 3,641,395 | A * | 2/1972 | Nation | 361/725 |
| 3,652,812 | A | 3/1972 | Ristuccia | |
| 3,666,340 | A * | 5/1972 | Albeanese, III | 312/283 |

(Continued)

FOREIGN PATENT DOCUMENTS

DE 2810115 9/1979

(Continued)

OTHER PUBLICATIONS

PCT International Search Report (PCT/US04/28975 filed Sep. 7, 2004), 6 total pages.

(Continued)

*Primary Examiner*—R. A. Smith
(74) *Attorney, Agent, or Firm*—Fish & Richardson P.C.

(57) ABSTRACT

A position indicator may include a position indicator display and mechanism. A polymer housing houses the position indicator display and mechanism and a one-piece clear polymer cover encloses the position indicator display and mechanism in the polymer housing. The position indicator may further include a hinge and hand-operated latch that secures the one-piece clear polymer cover to the polymer housing such that the one-piece clear polymer cover can be opened without the use of tools.

36 Claims, 10 Drawing Sheets

U.S. PATENT DOCUMENTS

| | | | | |
|---|---|---|---|---|
| 3,705,964 | A | 12/1972 | Romanowski et al. | |
| 3,761,650 | A * | 9/1973 | Fohrhaltz | 200/17 R |
| 3,818,747 | A * | 6/1974 | Van Riemsdijk | 74/436 |
| 3,861,559 | A | 1/1975 | McCormick | 220/664 |
| 4,061,963 | A | 12/1977 | Green | |
| 4,207,445 | A | 6/1980 | Hammar | |
| 4,287,764 | A * | 9/1981 | Staab et al. | 73/431 |
| 4,326,627 | A | 4/1982 | Massey et al. | |
| 4,419,619 | A * | 12/1983 | Jindrick et al. | 323/257 |
| 4,532,952 | A * | 8/1985 | Norwood | 137/240 |
| 4,533,797 | A | 8/1985 | Kranich, II et al. | |
| 4,595,806 | A | 6/1986 | Itoh | |
| 4,916,617 | A * | 4/1990 | Norwood | 702/13 |
| 5,056,377 | A | 10/1991 | Yatchum et al. | |
| 5,191,179 | A | 3/1993 | Yatchum et al. | |
| 5,506,377 | A | 4/1996 | Hill et al. | |
| 5,506,791 | A | 4/1996 | Hungerford et al. | |
| 5,523,535 | A | 6/1996 | Larsson et al. | |
| 5,744,764 | A | 4/1998 | Aschenbrenner et al. | |
| 5,834,717 | A | 11/1998 | Neumeyer et al. | |
| 6,060,669 | A | 5/2000 | Dohnal et al. | |
| 6,072,305 | A | 6/2000 | Trainor et al. | |
| 6,087,607 | A | 7/2000 | Dohnal et al. | |
| 6,091,032 | A | 7/2000 | Dohnal et al. | |
| 6,234,106 | B1 | 5/2001 | Dohnal et al. | |
| 6,557,485 | B1 | 5/2003 | Sauter | |
| 6,693,247 | B1 * | 2/2004 | Byers et al. | 200/11 TC |
| 6,737,855 | B2 * | 5/2004 | Huber et al. | 324/156 |
| 6,833,518 | B1 | 12/2004 | Byers et al. | |
| 7,343,873 | B2 * | 3/2008 | Hernandez et al. | 116/300 |
| 2002/0094702 | A1 * | 7/2002 | Herz | 439/55 |
| 2003/0034716 | A1 * | 2/2003 | Ramesh | 312/100 |
| 2003/0046975 | A1 | 3/2003 | Wewers et al. | |
| 2004/0022129 | A1 | 2/2004 | McGeever, Jr. | |
| 2005/0061641 | A1 * | 3/2005 | Hernandez et al. | 200/6 R |
| 2005/0269191 | A1 | 12/2005 | Lindsey et al. | |

FOREIGN PATENT DOCUMENTS

| | | | |
|---|---|---|---|
| DE | 3838195 | A1 * | 5/1989 |
| FR | 2697105 | | 4/1994 |
| JP | 57133313 | A * | 8/1982 |
| JP | 63-238514 | | 10/1988 |
| JP | 10318796 | A * | 12/1998 |

OTHER PUBLICATIONS

PCT Written Opinion (PCT/US04/28975) filed Sep. 7, 2004), 7 total pages.

Office Action dated Jun. 14, 2007 (U.S. Appl. No. 11/419,333).

First Office Action from the Patent Office of the People's Republic of China for Patent Application No. 200480032136.5, issued Feb. 15, 2008, 7 pages.

Translation of First Office Action from the Patent Office of the People's Republic of China for Patent Application No. 200480032136.5, issued Feb. 15, 2008, 4 pages.

McGraw-Edison, "Voltage Regulators", Jun. 1998, Cooper Power Systems, 225-10, pp. 1-8.

McGraw-Edison, "Tap Changer", Jun. 1998, S225-10-10, pp. 5-1 to 5-4.

Qualitrol Corporation, Position Indicator For Voltage Regulators (081-002-1), 2 pages.

Qualitrol Corporation, Position Indicator (082-020-01), 1 page.

Qualitrol Corporation, Position Indicator (082-001-01), 1 page.

* cited by examiner

STEP VOLTAGE REGULATOR POLYMER POSITION INDICATOR WITH NON-LINEAR DRIVE MECHANISM

TECHNICAL FIELD

This disclosure relates to position indicators for voltage regulators.

BACKGROUND

A position indicator may be used to indicate the position of a tap changer inside a step voltage regulator or a transformer. In general, the position indicator is an outdoor device that is exposed to environmental conditions such that moisture may get inside the device. The exposure to environmental conditions can result in detrimental corrosion, even when corrosion resistant coatings or materials are employed.

SUMMARY

In one general aspect, a position indicator includes a position indicator display and mechanism. A polymer housing houses the position indicator display and mechanism and a one-piece clear polymer cover encloses the position indicator display and mechanism in the polymer housing.

Implementations may include one or more of the following features. For example, the position indicator may include a hinge and a hand-operated latch that secures the one-piece clear polymer cover to the polymer housing such that the one-piece clear polymer cover can be opened without the use of tools. The hinge may include a first portion that is integrated with the polymer housing and a second portion that is integrated with the one-piece clear polymer cover.

In another general aspect, a position indicator includes an input shaft having an angular velocity. A pointer indicates a position of a tap changer having an angular velocity and a drive mechanism that is connected to the input shaft and the pointer, where the drive mechanism is non-linear such that the angular velocity of the input shaft is not directly related to the angular velocity of the pointer.

Implementations may include one or more of the following features. For example, the drive mechanism may include a Geneva-type mechanism. The resulting motion of the pointer may include a dwell. The drive mechanism may include an interchangeable output drive component to change the rotation of the pointer relative to the rotation of the input shaft. The drive mechanism may include an output drive component and the pointer may be integrated with the output drive component. The drive mechanism may include an output drive component and the position indicator may further include a maximum position pointer actuator that is integrated with the output drive component. The drive mechanism may include an output drive component and the position indicator may include a limit switch triggering cam that is integrated with the output drive component.

In another general aspect, a position indicator may include a main position indicating assembly and a modular maximum position indicating subassembly that is secured to the main position indicating assembly with a hand-operable fastener.

Implementations may include one or more of the following features. For example, the hand-operable fastener may include a thumbscrew. The modular maximum position indicating subassembly may include a polymer base. The position indicator may further include a drive mechanism having a concentric circular gap, where the modular maximum position indicating subassembly fits inside the concentric circular gap in the drive mechanism. The modular maximum position indicating subassembly may be configured to be secured to the main position indicating assembly without tools. The modular maximum position indicating subassembly may include a solenoid that is capable of receiving a quick connecting electrical connector.

In another general aspect, a position indicator may include a housing, a limit switch, and a one-piece limit switch adjuster that holds the limit switch and further includes integrated functionality to constrain the one-piece limit switch adjuster in the housing without fasteners.

Implementations may include one or more of the following features. For example, the one-piece limit switch adjuster may include a molded polymer part. The position indicator may further include a retaining ring, and the one-piece limit switch adjuster may include an integrated tab that mates with a notch on the retaining ring to hold the one-piece limit switch adjuster in place in the housing. The housing may include a channel and the one-piece limit switch adjuster slides in the channel in the housing. The one-piece limit switch adjuster may slide in the channel in the housing without a bearing or a hinge. The one-piece limit switch adjuster may include a rocker-type snap switch.

The above-described general aspect and implementations provide improvements and advantages over conventional position indicators that typically included multiple piece covers with rigid metal frames and a clear polymer window. In conventional position indicators, the covers may include multiple attachment points and a hinge, and may require lengthy assembly times and long opening and closing times for the end user when performing maintenance or repairs to the position indicator. In addition, the limit switch adjusters in conventional position indicators typically use many low-function components to position and adjust limit switches, resulting in a high assembly time and greater manufacturing costs. Conventional position indicators also may use a series of external mechanisms in order to maintain the position of the limit switch once it has been tripped.

In conventional position indicators, the drive systems between the tap changer of the step voltage regulator and the position indicator frequently included flexible shafts, loose mechanical joints, and/or other features that caused lost motion, which resulted in inaccurate position display and inaccurate activation of limit switches. The maximum position indicator and reset subsystem on a position indicator could malfunction prior to the main position indicating system. Some users prefer to replace the subsystem rather than the entire position indicator device, which involves disturbing the other components or functions of the position indicator.

Other features will be apparent from the description and drawings, and from the claims.

DESCRIPTION OF DRAWINGS

Like reference symbols in the various drawings indicate like elements.

DETAILED DESCRIPTION

Figure 1:
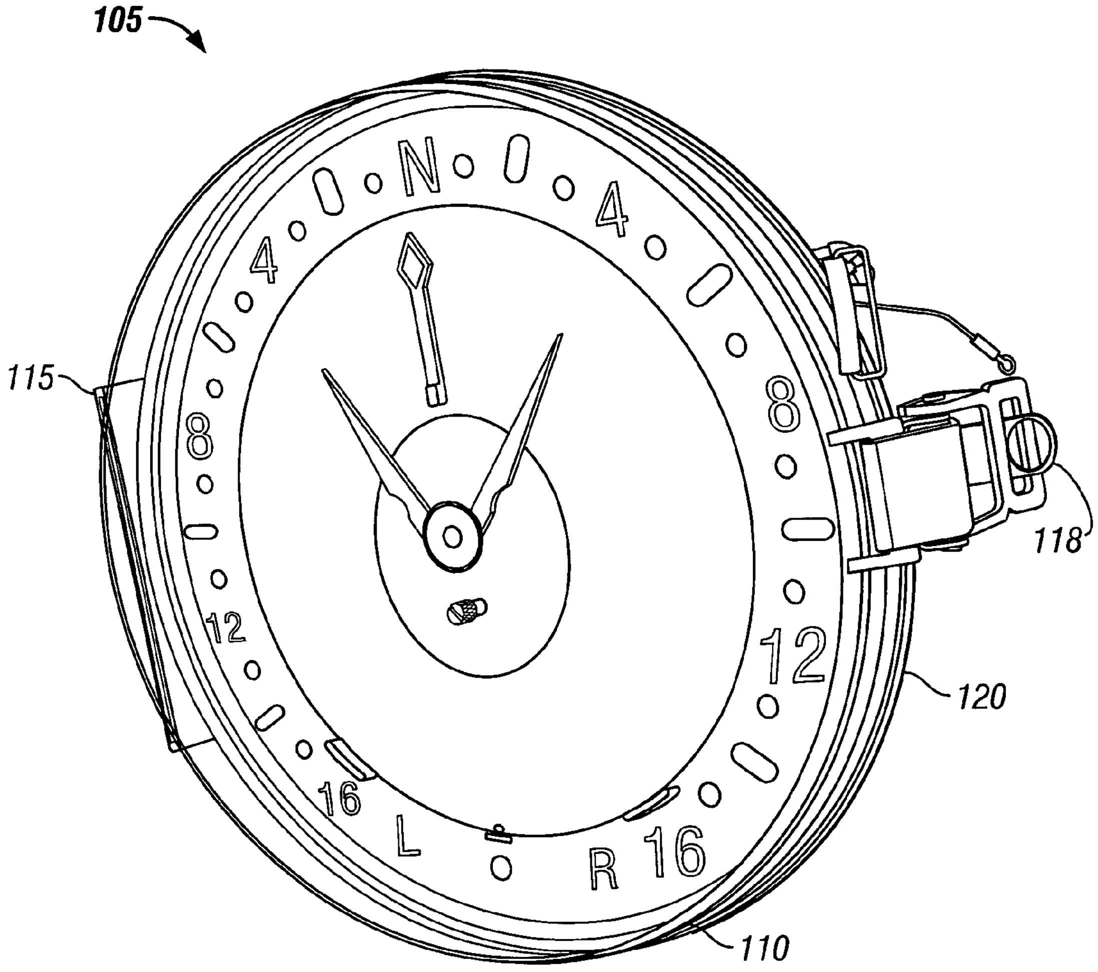
FIG. 1 is a diagram of a polymer position indicator with a non-linear drive mechanism.

A load tap changer or step voltage regulator may be used to control voltage variations due to load changes, and may be used, for example, on distribution circuits rated from 2,400 volts (60 kV BIL) through 34,500 volts (200 kV BIL) for either 50 or 60 Hz systems. A load tap changer is a device that employs a secondary circuit voltage detector to actuate a mechanical linkage to selectively engage different taps of a tapped section of a winding, in response to voltage variations, in order to control the output voltage of a transformer or voltage regulator while under load. The tap changer may be used to control the voltage of a singe-phase voltage regulator or a three-phase transformer.

One common load tap selector is a rotary load tap changer. The rotary tap changer actuates a rotary tap arm coupled to a stationary selector dial such that the rotary tap arm conductively and mechanically engages stationary contacts, which are in turn conductively connected to the windings taps. The rotary tap arm is driven between the stationary contacts in response to load variations. The load tap changer may vary the relationship between the input and output voltage of an electrical control device by, for example, ±10% from a nominal value. For example, the load tap changer may include sixteen taps, each of which adjusts the relationship by ⅝%, such that the total possible adjustment may be up to 10% (that is 16×⅝%). A polarity or reversing switch permits this adjustment to be positive or negative such that the step voltage may regulate voltage steps from "10% raise" to "10% lower."

Referring to FIG. 1, position indicator 105 may be connected to a step voltage regulator to indicate the position of the tap changer inside the step voltage regulator. The position indicator 105 uses weather-resistant polymer materials that are not susceptible to corrosion like conventional position indicators. Position indicator 105 includes a cover 110 that is a single piece of molded polymer. A hinge 115 and a quick-release spring latch 118 seal the cover 110 to the position indicator housing 120. A compliant gasket 200 (FIG. 2) is captured between the cover 110 and housing 120 to form a seal. The quick-release spring latch 118 enables the user to access the inside of the position indicator 105 using only one hand and without the use of tools. The quick-release spring latch 118 provides advantages over conventional position indicators that require the use of tools to open and secure a cover on the position indicator housing. In such indicators, multiple access points are used to secure the cover to the position indicator housing such that tools are required to open the cover of the conventional position indicator to access its internal mechanisms when, for example, maintenance or repairs need to be performed.

Figure 2:
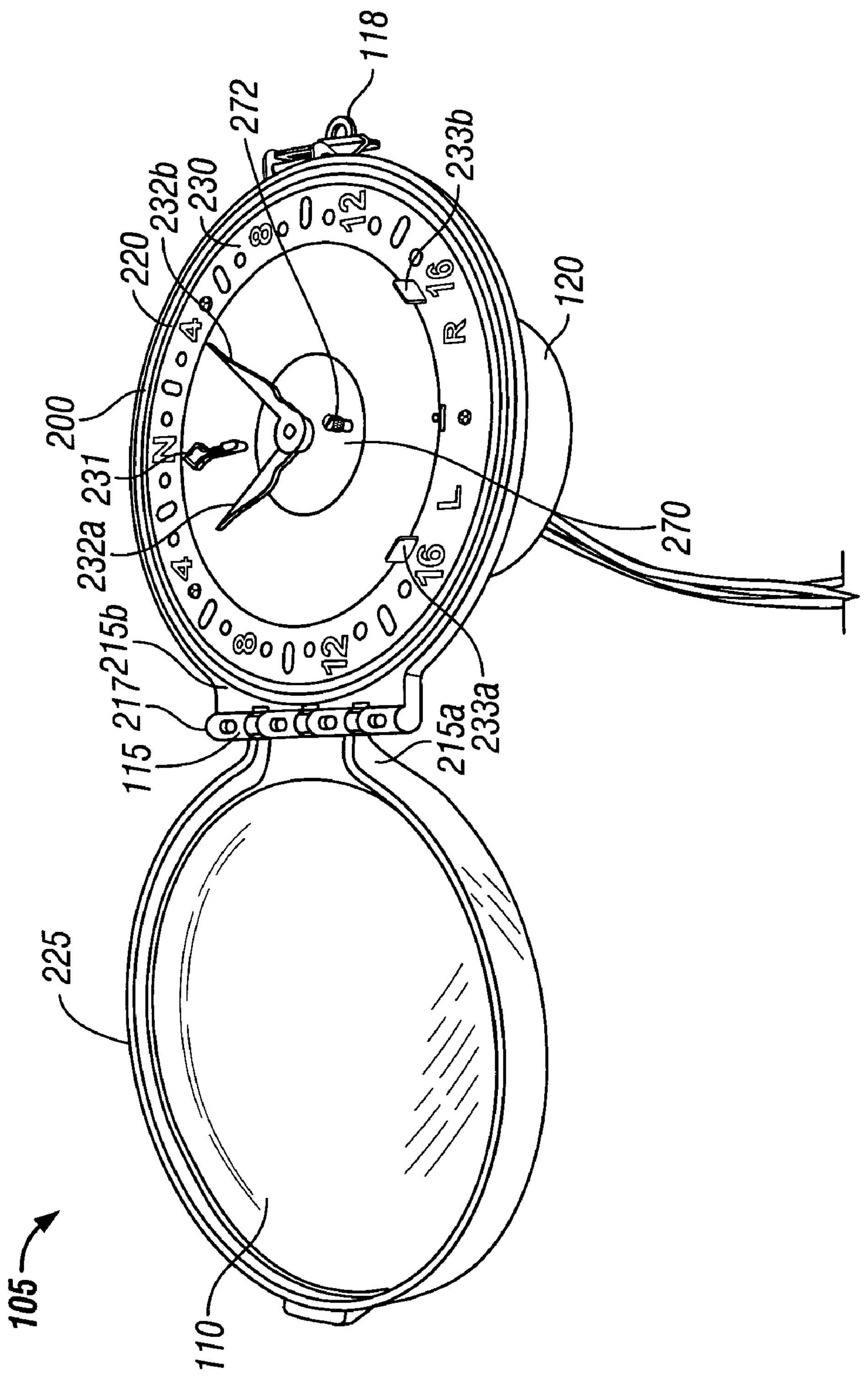
FIG. 2 is a diagram of the polymer position indicator of FIG. 1 in an open position.

Referring to FIG. 2, the cover 110 of position indicator 105 can be opened in order to access the components protected from the environment by the cover 110. The cover 110 swings about hinge 115 that is held together by a cylindrical pin 217. After the quick-release latch 118 has been opened, the cover 110 can be swung away from the housing 120. The cover 110 and housing 120 each have integrated hinges 215*a* and 215*b*. The cover hinge 215*a* and the housing hinge 215*b* mate such that the cylindrical pin 217 can be positioned to join the two parts, causing the housing 120 and cover 110 to rotate relative to each other on the axis defined by the pin 217. The quick-release latch 118 is mounted to the housing 120 in a position diametrically opposed to the hinge 215*b*. The latch 118 connects to an integrated connector in the cover 110 to position the cover 110 flush against the housing 120 when the latch 118 is closed. The latch 118 is operated by hand without the use of tools. A compliant gasket 200 that is positioned within a groove 220 in a housing 120 interfaces with a circumferential lip 225 of the cover 110 to provide a seal between the cover and the housing.

Opening position indicator 105 exposes the faceplate 230 on which the tap position is indicated. The faceplate 230 doubles as a retaining ring for some of the internal components of the position indicator 105. The middle of this ring is empty, so the faceplate 230 is not a solid disk as in conventional position indicators. The faceplate 230 is labeled with numbers and hash marks corresponding to the possible tap changer positions. The markings are disposed about an arc on the outer edge of the faceplate 230. The markings range from "16 lower" to "N," or "neutral," to "16 raise." There are 33 steps on this scale, indicating the 33 possible positions that the tap changer may occupy.

The present position of the tap changer is indicated on the dial by the main pointer 231, which is currently pointing to approximately "N". A modular maximum position indicator subassembly 270 includes two auxiliary pointers 232*a* and 232*b* that indicate the maximum position that has been achieved in both the raise and lower directions. Pointer 232*a* indicates that the maximum position that has been achieved in the lower direction is "4 lower," while pointer 232*b* indicates that the maximum position achieved in the raise direction is "4 raise." The two tabs 233*a* and 233*b* toward the bottom of the faceplate 230 indicate the set points of the internal limit switch adjusters (not shown) that prevent the tap changer from moving past the intended limits. In this example, the lower limit tab 233*a* is set to "16 lower" and the upper limit tab 233*b* is set to "16 raise" such that the full range of operation is permitted. The subassembly 270 is held in place by thumbscrew 272.

The position indicator 105 is typically used outdoors where it may be exposed to environmental conditions. Position indicator 105 provides advantages over conventional position indicators in that it is less susceptible to corrosion that results from moisture and other environmental elements.

Figure 3:
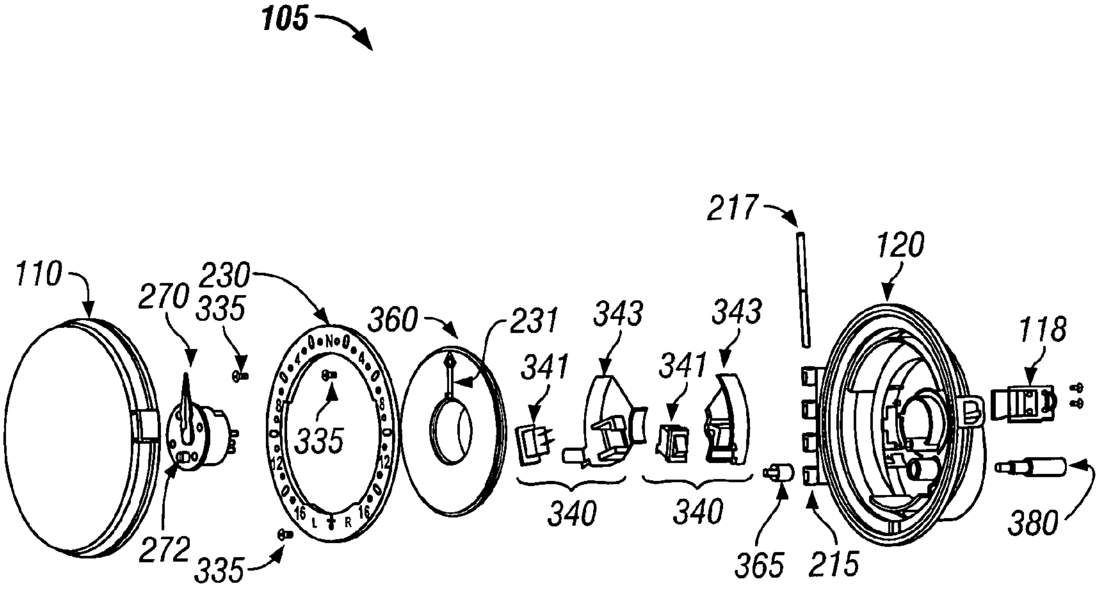
FIG. 3 is an exploded view diagram of the polymer position indicator of FIG. 1.

Referring to FIG. 3, position indicator 105 includes modular and hand-operable parts that facilitate maintenance without requiring the use of tools to gain access to the position indicator components. As previously noted, position indicator 105 includes a single piece polymer cover 110 that is connected to the position indicator housing 120 using a cylindrical pin 217 inserted through hinge 215. The cover 110 and housing 120 enclose the mechanism of the position indicator 105. A quick-release spring latch 118 is used to secure and the cover 110 to the housing 120 and can be operated by hand. Faceplate 230 has markings to indicate the position of the tap changer, and it serves as a retaining ring for some of the internal components of the position indicator 105. Faceplate 230 is held to the housing 120 with one or more fasteners (e.g., screws 335). Limit switch adjusters 340 include a rocker-type limit switch 341 and a single piece polymer part 343 with features to hold the limit switch 341 in place and allow it to move without a hinge or bearing. There are two symmetrical, but distinct, limit switch adjusters 340, one of which is for the raise side and the other of which is for the lower side.

There are two concentric pieces in the space on the inside of the faceplate 230. The first of these is the Geneva wheel 360, which, with sprocket 365, forms the non-linear drive mechanism that compensates for motion lost in the drive system from the tap changer to the position indicator 105. The main pointer 231 is mounted on the Geneva wheel 360 such that the main pointer 231 moves as the Geneva wheel 360 turns. The Geneva wheel 360 is held on a fixed rotational axis by the faceplate 230, which mounts to the housing. The space on the inside of the Geneva wheel 360 is occupied by the modular maximum position indicator subassembly 270. The subassembly 270 is held in place by thumbscrew 272 that can be tightened and loosened by hand without the use of any tools. The subassembly 270 allows for the contained mechanism to be repaired or replaced without disturbing any other components or functions of the position indicator 105.

An input shaft 380 connects the position indicator 105 to a rotating mechanism at the tap changer within the step voltage regulator. This design allows for operation and maintenance of the position indicator 105 by hand and without the use of tools.

Figure 4A:
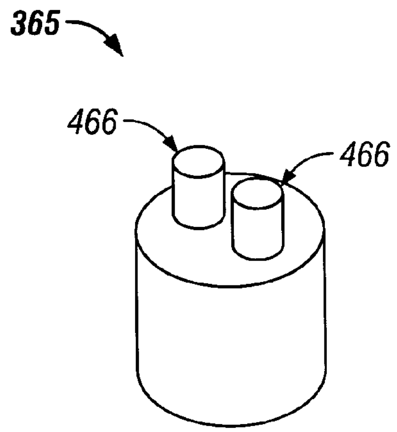
FIGS. 4*a* and 4*b* are diagrams of sprockets from the non-linear drive mechanism of the polymer position indicator of FIG. 1.
Figure 5:
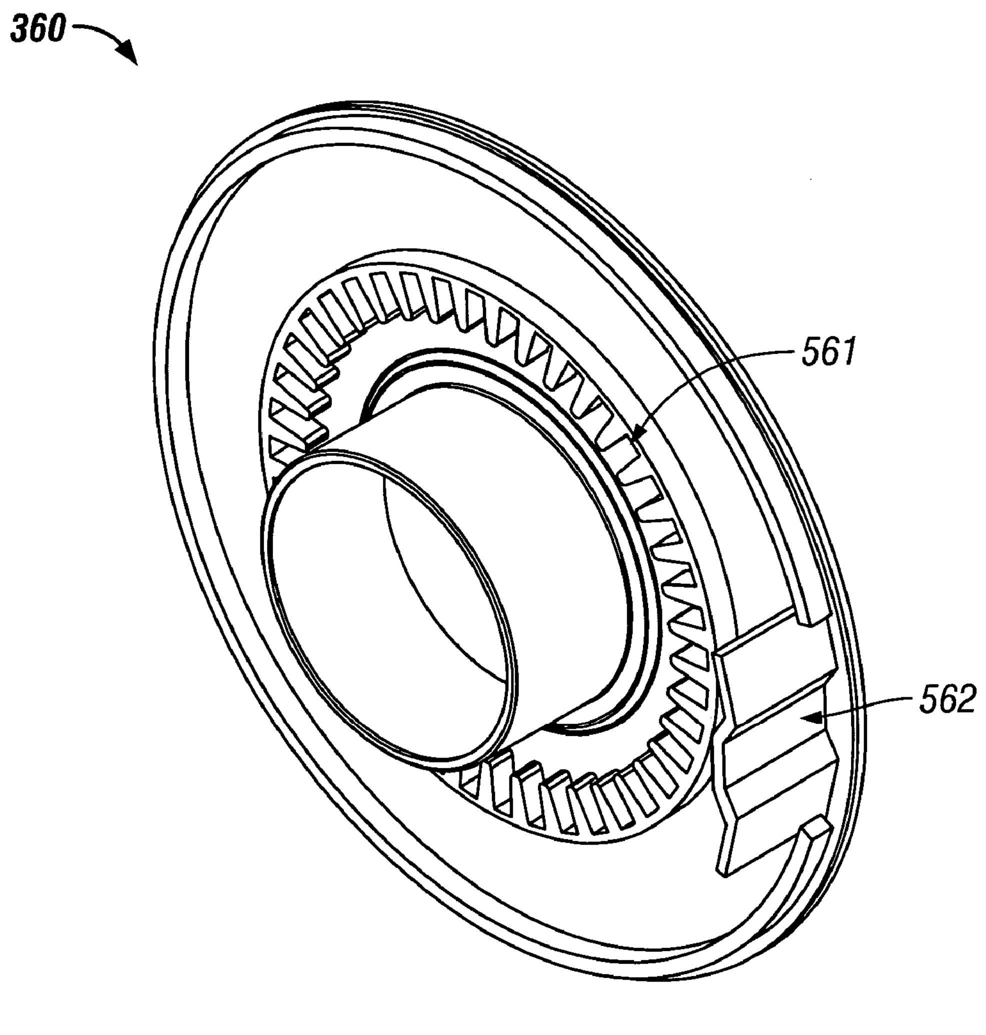
FIGS. 5-7 are diagrams of a Geneva wheel of the non-linear drive mechanism of the polymer position indicator of FIG. 1.

Referring to FIGS. 4*a* and 5, Geneva wheel 360 interacts with a sprocket 365 to drive the main pointer to indicate the position of the tap changer. Pins 466 of the sprocket 365 fit into slots 561 that are distributed uniformly on the back side of Geneva wheel 360. Sprocket 365 connects to the input shaft 380 of FIG. 3 that originates at the tap changer within the step voltage regulator. The input shaft 380 is connected to a rotational drive from the tap changer on the external side of the housing 120 of FIG. 3. The input shaft 380 extends through the back of the position indicator housing 120 and attaches to the polymer sprocket 365 inside the position indicator housing 120. The rotational drive at the tap changer causes the input shaft 380 to turn, which, in turn, causes the sprocket 365 to turn.

Cylindrical pins 466 which, extend from one face of sprocket 365 and have a circular cross-section, fit into slots 561 on polymer Geneva wheel 360. The pins 466 are diametrically opposed to one another. As the sprocket 365 turns, the pins 466 move in and out of the slots 561 on the Geneva wheel 360, causing it to turn. Using two pins 466 instead of just one, as is used by the mechanism on the tap changer, causes the Geneva wheel 360 to index one position with every 180 degrees of rotation of the sprocket 365 rather than with every 360 degrees of rotation of the sprocket 365.

The slots 561 on the Geneva wheel 360 are positioned every nine degrees such that every half revolution of the sprocket 365 results in nine degrees of rotation of the Geneva wheel 360. Referring back to FIG. 2, the markings on the faceplate 230 are disposed about an arc at nine-degree increments such that the main pointer 231 is aligned to consecutive characters as the input shaft is rotated 180 degrees by the tap changer between each tap position.

There exists a point of instantaneous dwell of the Geneva wheel 360 when both sprocket pins 466 are symmetrically positioned in adjacent slots 561. At this point, one pin 466 is moving straight up and out of a slot 561, while the other pin 466 is moving straight down and into a slot 561. In other words, the motion of either pin 466 is moving in a direction that is directed toward or away from the center of Geneva wheel 360; no part of the motion is perpendicular to the slot 561. This will not cause the Geneva wheel 360 to rotate, so there is an instantaneous point of dwell of the Geneva wheel 360. Using two pins 466 rather than just one pin 466 results in only an instantaneous dwell rather than a dwell that consists of 180 degrees or more of the rotation of a single-pinned sprocket 365 when the pin is not traveling in the slots.

The relationship of the sprocket pins 466 and the Geneva wheel slots 561 is such that there is an indirect relationship between the angular velocity of the sprocket 365 and the resulting angular velocity of the Geneva wheel 360. This type of mechanism produces a non-linear relationship between the rotation of the input shaft 380 and the pointer 231. The resulting pointer motion is advantageous because it compensates for lost motion in the system between the tap changer and the position indicator so that the position indicator display is more accurate and the limit switches (e.g., limit switches 341 of FIG. 3) are tripped more reliably.

The Geneva drive system also has fewer moving components than the geartrain drives used in conventional position indicators. In the Geneva drive system there are only three moving parts: input shaft 380, sprocket 365, and Geneva wheel 360.

The Geneva wheel 360 also includes a limit switch cam 562 that is molded into the same side of the Geneva wheel 360 as the slot pattern. The limit switch cam 562 trips the limit switches (e.g., limit switches 341 of FIG. 3) as the Geneva wheel 360 moves past them.

Figure 4B:
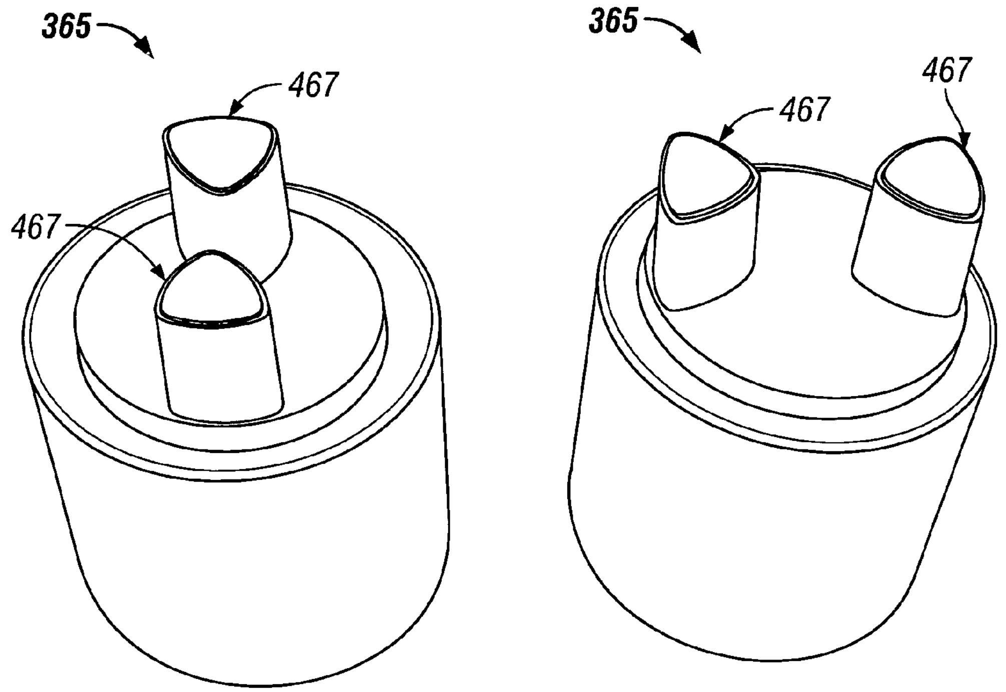

Referring to FIG. 4*b*, another exemplary implementation of sprocket 365 is illustrated. In this implementation, the pins 467 have a non-circular cross-sectional shape. The pins 467 include three curved sides with rounded comers. This type of pin shape further augments the non-linear relationship between the rotation of the input shaft 380 and the pointer 321. For instance, a sprocket with pins 467 is capable of developing a dwell of approximately 35 degrees, and yet still completes the same range of motion as the circular cross-section pins 466. In other implementations, other types of pin shapes are possible.

Figure 6:
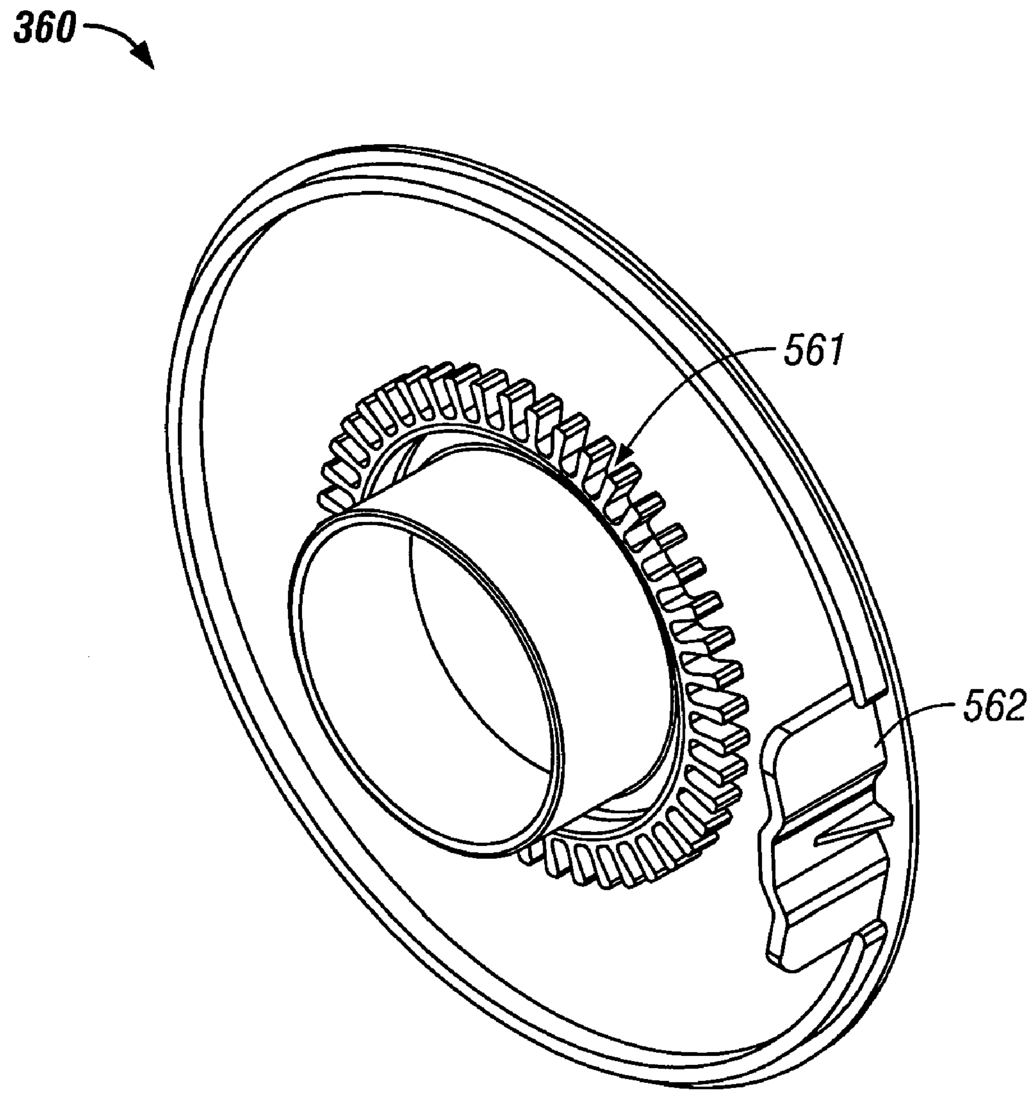

Referring to FIG. 6, the direction of rotation of Geneva wheel 360 relative to the rotation of the input shaft 380 and sprocket 365 is dependent on the design of the Geneva wheel slots 561. When the axis of the sprocket 365 is further from the Geneva wheel 360 axis than the slot pattern 561, as the inverse Geneva mechanism illustrates in FIG. 6, the sprocket 365 and Geneva wheel 360 rotate in opposite directions. On the other hand, when the axis of the sprocket 365 is located closer to the Geneva wheel 360 axis than the slot pattern 561, as illustrated in FIG. 5, the sprocket 365 and Geneva wheel 360 rotate in the same direction. This is typically referred to as an inverse Geneva mechanism. Both cases may be desirable depending on the rotation provided by the tap changer and the input shaft, and either case can be accomplished in the position indicator 105. This is not done by moving the position of the sprocket 365 relative to the Geneva wheel 360. Rather it is done by moving the position of the slots 561 on the Geneva wheel 360. As a result, only one part needs to be modified to reverse the direction of rotation of the input shaft and the pointer as opposed to conventional mechanisms, where multiple components need to be modified to reverse the direction of rotation of the input shaft.

Figure 7:
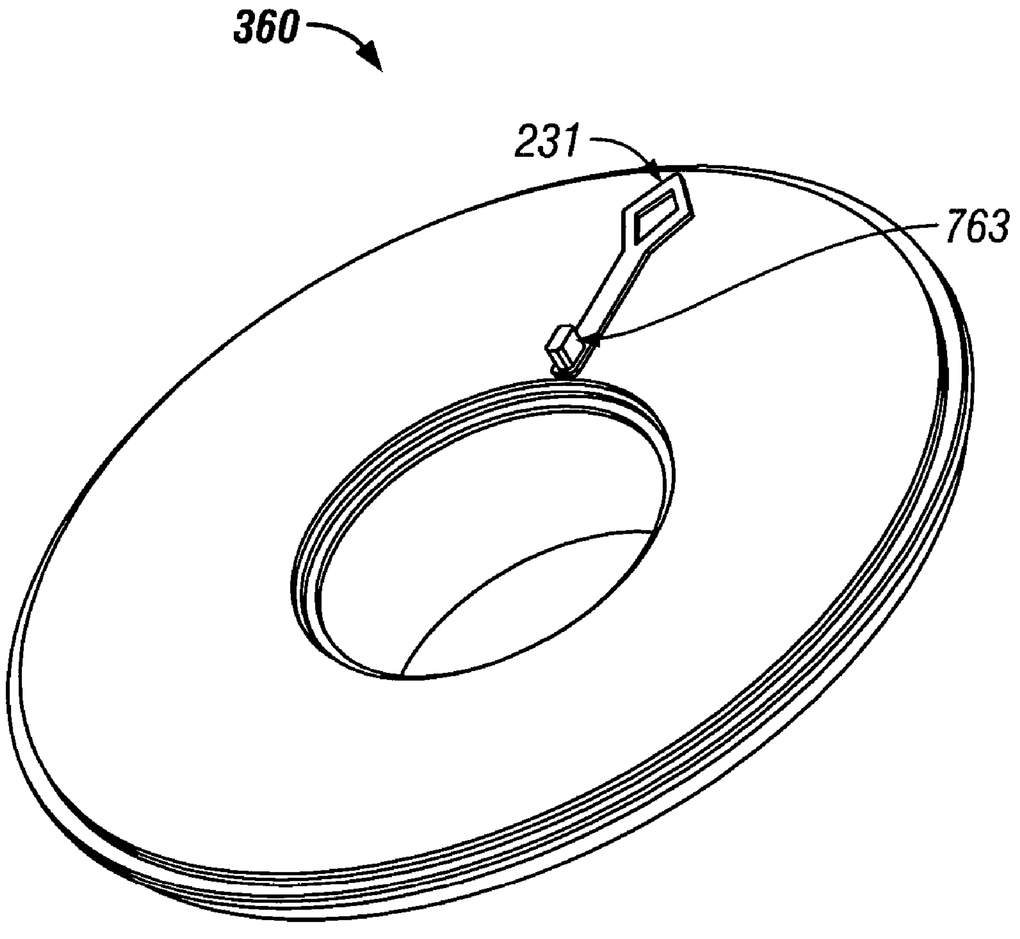

Referring to FIG. 7, the Geneva wheel 360 turns to indicate the tap changer position. Main pointer 231 is integrated into the front of Geneva wheel 360. As the Geneva wheel 360 turns, the main pointer 231 points to the current tap changer position. The maximum position pointer actuator 763 is also molded onto the front side of the Geneva wheel 360. As the main pointer 231 moves past one of the maximum position pointers (e.g., maximum position pointers 232*a* and 232*b* of FIG. 2), the maximum position pointer actuator 763 pushes the maximum position pointers 232*a* and 232*b* of FIG. 2 to point to the new maximum value. Integrating the main pointer 231 and the maximum position pointer actuator 763 as part of the Geneva wheel 360 results in an overall reduction in the number of components in position indicator. In contrast, the main pointer in conventional position indicators typically is attached at the back of the faceplate by attaching to a shaft that passes through the faceplate to the drive mechanism.

Figure 8:
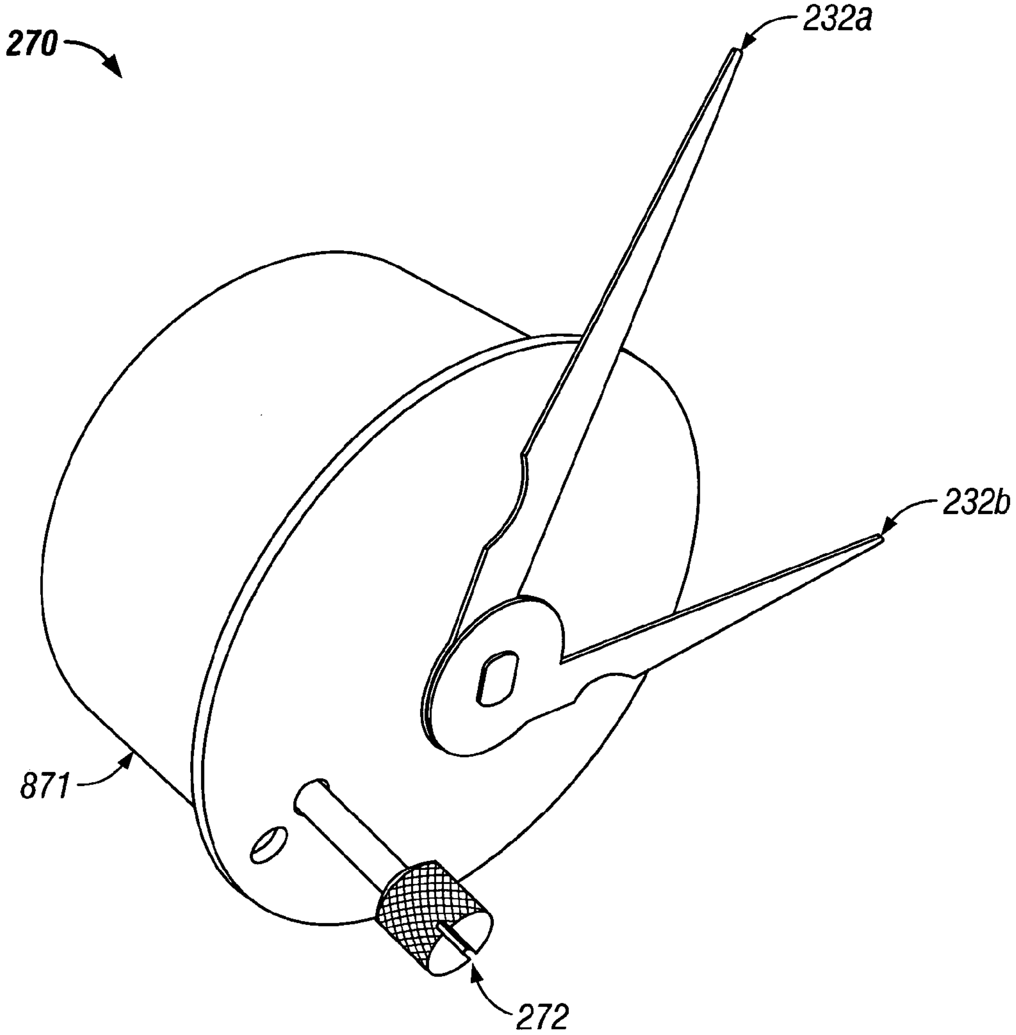
FIG. 8 is a diagram of a maximum position indicating subassembly of the polymer position indicator of FIG. 1.

Referring to FIG. 8, modular maximum position indicator and reset subsystem 270 can be removed and reassembled after opening the position indicator cover 110 without disturbing any other components or functions of the position indicator 105. The modular maximum position indicating subassembly 270 includes a polymer base 871 that fits inside a concentric, circular gap on the Geneva wheel 360. The base 871 attaches to the position indicator housing 120. Through the base 871 are mounted an inner and an outer shaft, each with a maximum position pointer 232*a* and 232*b* attached on the display side of the base 871. The pointers 232*a* and 232*b* are engaged by the maximum position pointer actuator 763 on the Geneva wheel 360 as it turns. The subassembly 270 is then positioned within the Geneva wheel 360 inside the housing 120, and a thumbscrew 272 that attaches the subassembly 270 to the housing 120 is tightened by hand to complete the assembly process.

In conventional position indicators, these assemblies may use mostly brass and zinc-coated steel components.

Figure 9:
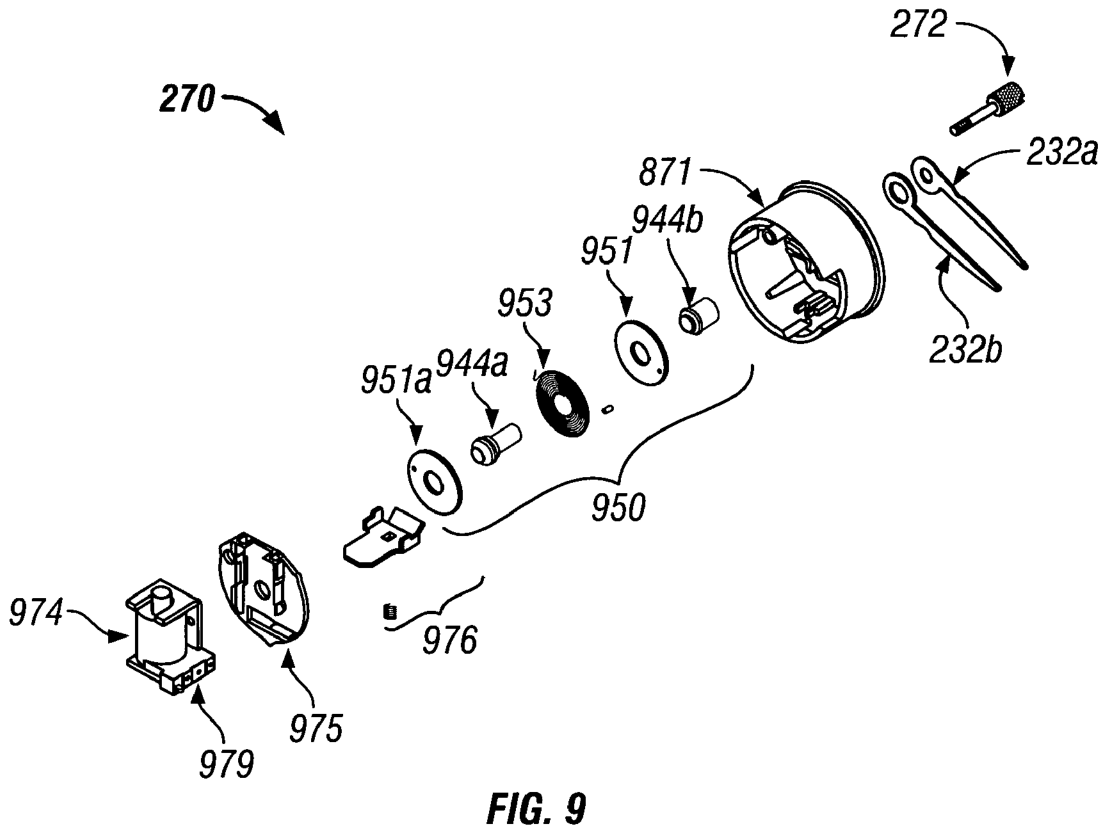
FIG. 9 is an exploded view diagram of the maximum position indicator subassembly of FIG. 8.

Referring to FIG. 9, maximum position indicator subassembly 270 includes the features to hold and release the maximum position pointers 232*a* and 232*b* at the appropriate time. A thumbscrew 272 is inserted through the face of the base 871 of the maximum position indicator subassembly 270 to hold the subassembly 270 to the position indicator housing 120. The maximum position pointer reset mechanism 950 that is connected to the inner and outer shafts on the internal side of the base 871 holds the pointers 232*a* and 232*b* in place until triggered to release. The maximum position pointer reset mechanism 950 includes inner shaft 944*a*, outer shaft 944*b*, ratcheting gears 951*a* and 951*b*, and a clock-type torsion spring 953. A solenoid 974 is mounted to the base 971 by a bracket 975 to allow the pointers 232*a* and 232*b* to return by releasing a spring-loaded latch 976 when the solenoid 974 is energized. Electricity is supplied to the solenoid 974 by wires running through the position indicator 105. The wire connections 979 to the solenoid are quick connecting, slide-type connectors that do not require any tools for connection. The combination of the hand-operated latch (e.g., hand-operated latch 118 of FIGS. 1 and 2) on the position indicator cover (e.g., position indicator cover 110 of FIGS. 1 and 2), electrical quick connectors 979, and attachment using the thumbscrew 272 allows for the module to be assembled and replaced by hand without any tools.

Figure 10:
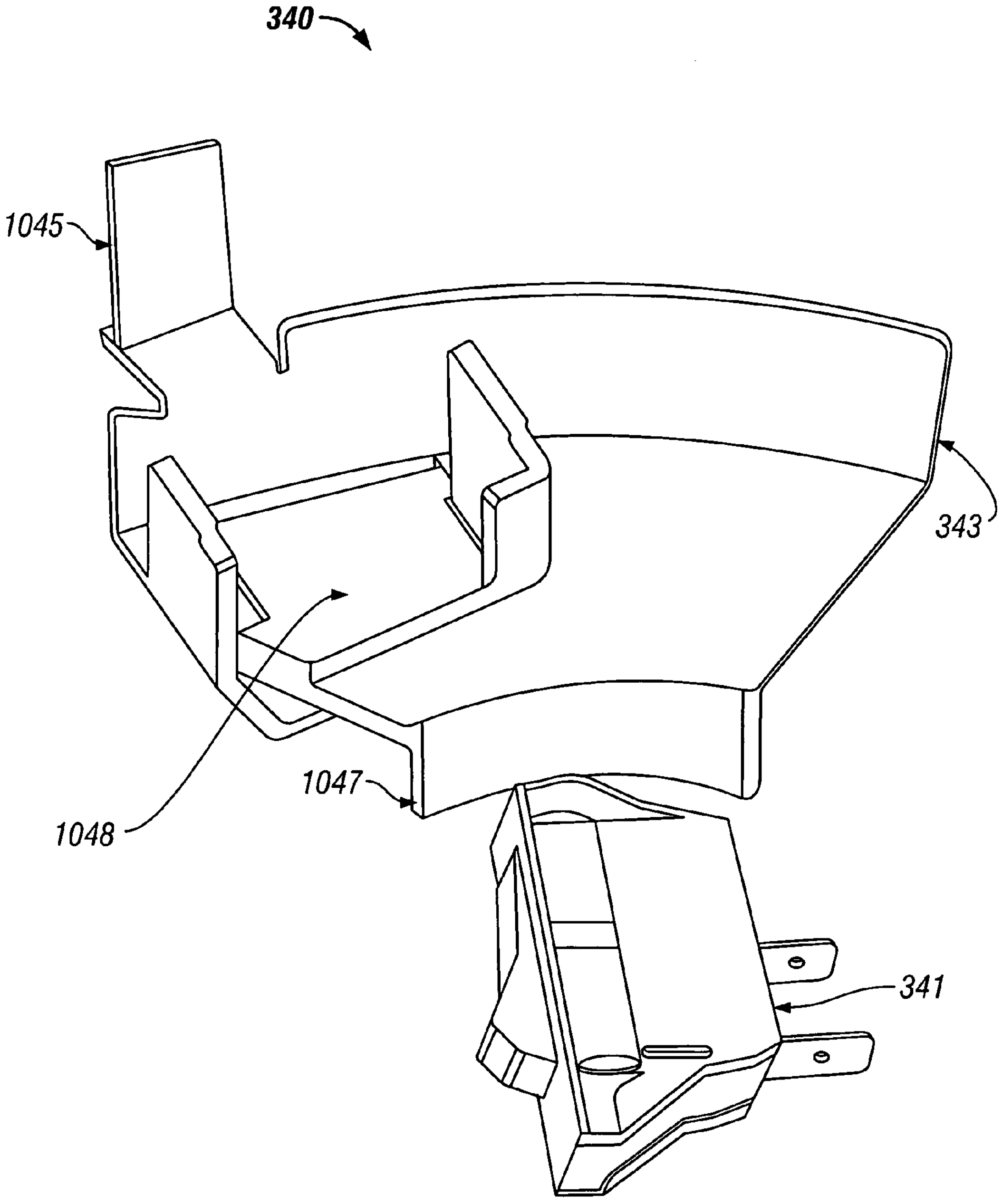
FIG. 10 is a diagram of a limit switch adjuster for the polymer position indicator of FIG. 1.

FIG. 10 illustrates one of the two limit switch adjusters 340. One of the limit switch adjusters is set to the maximum tap changer position for the raise position and the other is set to the maximum tap changer position for the lower position. The one-piece limit switch adjuster 340 includes integrated features that allow the limit switch 341 to snap into place without fasteners. The limit switch adjuster 340 includes a polymer part 343 with integral features for multiple functions. Snap features 1048 are incorporated in the geometry of each adjuster to locate and clamp a limit switch 341. Each adjuster 340 is arch-shaped to fit within the geometry of the position indicator housing (e.g., position indicator housing 120 of FIG. 2). A flange 1047 at the inner radius of the adjuster fixes it in the radial direction by mating to a channel formed in the housing 120. The flange 1047 on the limit switch adjuster 340 and the corresponding channel on the housing 120 allow the adjuster to rotate on the same axis as the Geneva wheel (e.g., Geneva wheel 360 of FIG. 3) and the retaining ring/faceplate (e.g., retaining ring/faceplate 230 of FIGS. 2 and 3) without a bearing or a hinge.

Each limit switch adjuster 340 is constrained in the axial direction by the base of the maximum position subassembly 270 against the flange 1047 on the inner radius and a fixed tab 1045 that contacts the retaining ring/faceplate 230 on the outer radius. A flexible tab 1045 on each adjuster mates to a series of slots at predetermined positions on the retaining ring/faceplate 230. The slots are arranged along the inner diameter of the faceplate 230 and correspond to the positions of the tap changer. The flexible tab 1045 on the adjuster can be pushed away from the slot to slide the limit switch adjuster 340 to another position. The limit switch adjuster 340 is prevented from rotating when the flexible tab 1045 is mated with any of the slots on the retaining ring/faceplate 230.

Referring back to FIG. 5, a cam 562 that protrudes from the slotted side of the Geneva wheel 360 toggles the limit switch 341 as the Geneva wheel 360 turns to align the main pointer 231 to the position for which the limit switch adjuster 340 is set. The limit switch 341 is a rocker-type electrical switch that toggles to maintain the position of operation. The limit switch 341 also has features that allow it to snap into place on polymer part 343 of the limit adjuster.

The features described above provide advantages over conventional position indicator designs. For instance, in conventional position indicators, multiple components may be attached to the back of the faceplate. For example, the limit switch adjuster may be mounted to the back of the faceplate and may include “snap-action” switches that are triggered by a lever. A toggle cam may be used to contact the switch lever and maintain the limit switch in the tripped position, even if the activating arm moves past the position at which the limit switch is set to trip. In other conventional position indicators, some of the internal mechanisms may be mounted inside the position indicator housing rather than on the back of the faceplate, but their function is the same. Furthermore, in both types of conventional position indicators, the entire faceplate must be removed to make any repairs to the maximum position and reset mechanism.

Additionally, conventional position indicators may use spur gears to reduce the rotation of the input shaft from the tap changer to achieve the proper angular rotation of the main pointer, which produces a linear relationship in the angular motion between the input shaft 880 and the main pointer. Based on the direction of rotation of the input shaft, the direction of rotation of the spur gears and the main pointer may need to be reversed in order to properly indicate the position of the tap changer. In this conventional design, the number of gears in the drive system must be altered to change the relative direction of rotation.

Other exemplary conventional position indicators may use a worm gear and pinion gear that are mounted to the back of the position indicator faceplate to reduce the rotation of the input shaft from the voltage regulator to drive the main pointer. Similar to a spur gear, a worm gear and a pinion gear also result in a linear relationship between the rotation of the input shaft and the rotation of the main pointer. The worm gear also changes the direction of the rotation of the input shaft in cases where the input shaft does not enter the position indicator housing straight through the back but rather though one of the sides. Based on the direction of rotation of the input shaft, the direction of rotation of the worm gears, the pinion gear, and the main pointer may need to be reversed. To do this, the direction of the worm gear thread and the helix angle for the pinion gear must be altered to change the relative direction of rotation.

A number of implementations have been described. Nevertheless, it will be understood that various modifications may be made. Accordingly, other implementations are within the scope of the following claims.

What is claimed is:

1. A position indicator, comprising:

a position indicator display and mechanism;

a polymer housing that includes the position indicator display and mechanism, wherein a ring formed on an inner surface of the polymer housing is in contact with at least part of the position indicator display and mechanism;

a one-piece clear polymer cover configured to enclose the position indicator display and mechanism in the polymer housing; and a hand-operated fastening device that secures the one-piece clear polymer cover to the polymer housing such that an interaction between the polymer housing and the one-piece clear polymer cover creates a seal between the one-piece clear polymer cover and the polymer housing.

2. The position indicator of claim 1 wherein:

the hand-operated fastening device includes a latch, and the latch secures the one-piece clear polymer cover to the polymer housing such that the one-piece clear polymer cover can be opened without the use of tools.

3. The position indicator of claim 1, further comprising: an input shaft having an angular velocity;

wherein the position indicator display includes a pointer to indicate a position of a tap changer and the pointer has an angular velocity.

4. The position indicator of claim 3 wherein the position indicator mechanism includes a drive mechanism connected to the input shaft and to the pointer.

5. The position indicator of claim 4 wherein the drive mechanism includes a Geneva-type mechanism.

6. The position indicator of claim 4 wherein a resulting motion of the pointer includes a dwell.

7. The position indicator of claim 4 wherein the drive mechanism includes an interchangeable output drive component to change rotation of the pointer relative to rotation of the input shaft.

8. The position indicator of claim 4 wherein the drive mechanism includes an output drive component and the pointer is integrated with the output drive component.

9. The position indicator of claim 4 wherein the drive mechanism includes an output drive component and the position indicator further comprises a maximum position pointer actuator that is integrated with the output drive component.

10. The position indicator of claim 4 wherein the drive mechanism includes an output drive component and the position indicator further comprises a limit switch triggering cam that is integrated with the output drive component.

11. The position indicator of claim 4 wherein the drive mechanism is non-linear such that the angular velocity of the input shaft is not directly related to the angular velocity of the pointer.

12. The position indicator of claim 4 wherein the pointer is mounted on the drive mechanism.

13. The position indicator of claim 1 further comprising a compliant gasket positioned within a groove in the polymer housing such that the gasket interfaces with a circumferential lip provided around the one-piece clear polymer cover to provide the seal between the polymer housing and the cover.

14. The position indicator of claim 1, wherein the one-piece polymer cover is secured to the polymer housing at a single access point.

15. The position indicator of claim 1, further comprising a hinge connected to the one-piece clear polymer cover and the polymer housing, and wherein the one-piece clear polymer cover is configured to rotate about the hinge.

16. The position indicator of claim 15 wherein the hinge includes a first portion that is integrated with the polymer housing and a second portion that is integrated wit the one-piece clear polymer cover.

17. The position indicator of claim 16, further comprising a removable pin configured to join the first and second portions of the hinge.

18. A position indicator, comprising:

a position indicator display and mechanism, the position indicator display comprising:

a main position indicating assembly, and a modular maximum position indicating subassembly that is secured to the main position indicating assembly with a hand-operable fastener;

a polymer housing to house the position indicator display and mechanism; and a one-piece clear polymer cover enclosing the position indicator display and mechanism in the polymer housing.

19. The position indicator of claim 18 wherein the hand-operable fastener includes a thumbscrew.

20. The position indicator of claim 18 wherein the modular maximum position indicating subassembly includes a polymer base.

21. The position indicator of claim 18 wherein the position indicator mechanism includes a drive mechanism having a concentric circular gap, wherein the modular maximum position indicating subassembly fits inside the concentric circular gap in the drive mechanism.

22. The position indicator of claim 18 wherein the modular maximum position indicating subassembly is configured to be secured to the main position indicating assembly without tools.

23. The position indicator of claim 18 wherein the modular maximum position indicating subassembly includes a solenoid that is capable of receiving a quick connecting electrical connector.

24. A position indicator, comprising:

a position indicator display and mechanism;

a polymer housing to house the position indicator display and mechanism;

a one-piece clear polymer cover enclosing the position indicator display and mechanism in the polymer housing;

a limit switch; and a one-piece limit switch adjuster tat holds, the limit switch and further includes integrated functionality to constrain the one-piece limit switch adjuster in the polymer housing without fasteners.

25. The position indicator of claim 24 wherein the one-piece limit switch adjuster includes a molded polymer part.

26. The position indicator of claim 24 further comprising a retaining ring, and wherein the one-piece limit switch adjuster includes an integrated tab that mates with a notch on the retaining ring to hold the one-piece limit switch adjuster in place in the polymer housing.

27. The position indicator of claim 24 wherein the polymer housing includes a channel and the one-piece limit switch adjuster slides in the channel in the polymer housing.

28. The position indicator of claim 27 wherein the one-piece limit switch adjuster slides in the channel in the polymer housing without a bearing or a hinge.

29. The position indicator of claim 24 wherein the one-piece limit switch adjuster includes a rocker-type snap switch.

30. A position indicator, comprising:

a position indicator display and mechanism, wherein the position indicator mechanism includes a one-piece limit switch adjuster;

a polymer housing to house the position indicator display and mechanism; and a one-piece clear polymer cover enclosing the position indicator display and mechanism in the polymer housing.

31. A position indicator, comprising:

a position indicator display and mechanism, wherein the position indicator mechanism includes a modular maximum position indicator;

a polymer housing to house the position indicator display and mechanism; and a one-piece clear polymer cover enclosing the position indicator display and mechanism in the polymer housing.

32. A position indicator, comprising:

a position indicator display and mechanism, wherein the position indicator mechanism includes a limit switch adjuster;

a polymer housing that includes the position indicator display and mechanism, wherein a ring formed on an inner surface of the polymer housing is in contact with at least part of the position indicator display and mechanism; and a one-piece clear polymer cover configured to enclose the position indicator display and mechanism in the polymer housing.

33. The position indicator of claim 32, wherein the limit switch adjuster is a one-piece limit switch adjuster.

34. A position indicator, comprising:

a position indicator display and mechanism;

a polymer housing to house the position indicator display and mechanism;

a one-piece clear polymer cover configured to enclose the position indicator display and mechanism in the polymer housing;

a limit switch; and a limit switch adjuster that holds the limit switch and further includes integrated functionality to constrain the limit switch adjuster in the polymer housing without fasteners.

35. The position indicator of claim 34, wherein the limit switch adjuster is a one-piece limit switch adjuster.

36. The position indicator of claim 34, wherein the limit switch adjuster includes a molded polymer part.

* * * * *

UNITED STATES PATENT AND TRADEMARK OFFICE

CERTIFICATE OF CORRECTION

PATENT NO. : 7,614,357 B2
APPLICATION NO. : 10/656881
DATED : November 10, 2009
INVENTOR(S) : Hernandez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 324 days.

Signed and Sealed this

Nineteenth Day of October, 2010

David J. Kappos

*Director of the United States Patent and Trademark Office*